United States Patent [19]

Arinobu et al.

[11] 4,448,023
[45] May 15, 1984

[54] PRESSURE WAVE ATTENUATING MAIN STEAM LINE APPARATUS

[75] Inventors: Mutsihiro Arinobu, Tokyo; Isamu Suzuki, Yokohama, both of Japan

[73] Assignee: Tokyo Shibaura Denki Kabushiki Kaisha, Japan

[21] Appl. No.: 301,818

[22] Filed: Sep. 11, 1981

[30] Foreign Application Priority Data

Oct. 20, 1980 [JP] Japan ................. 55-146423

[51] Int. Cl.³ .............................................. G12D 5/00
[52] U.S. Cl. ..................................... 60/644.1; 60/657; 376/281; 376/378
[58] Field of Search ...................... 60/644.1, 646, 657; 376/281, 297, 378, 379; 137/207

[56] References Cited

U.S. PATENT DOCUMENTS 3,029,197  4/1962  Untermyer ..................... 60/644.1 X
4,150,546  4/1979  Collett ........................... 60/644.1 X

FOREIGN PATENT DOCUMENTS 55-62397  5/1980  Japan .

Primary Examiner—Allen M. Ostrager
Assistant Examiner—Stephen F. Husar
Attorney, Agent, or Firm—Finnegan, Henderson, Farabow, Garrett & Dunner

[57] ABSTRACT

A main steam line apparatus of a boiling water nuclear reactor plant including piping for introducing a steam produced in a pressure vessel into a turbine, a main steam valve for rapidly stopping the steam being supplied to the turbine through the piping, and a header. The header is located in the piping between the pressure vessel and the main steam valve. The header causes the pressure wave which occurs when the main steam valve is rapidly closed to be attenuated and an increase in pressure vessel pressure to be suppressed.

1 Claim, 3 Drawing Figures

PRESSURE WAVE ATTENUATING MAIN STEAM LINE APPARATUS

BACKGROUND OF THE INVENTION

This invention relates to a main steam line apparatus for use with a nuclear reactor plant, especially a boiling water nuclear reactor.

In the case of a boiling water reactor, steam produced in a pressure vessel typically is introduced into a turbine through a main steam line apparatus. The main steam line apparatus generally includes piping through which the steam flows, a main steam valve, a main steam control valve and main steam isolation valves, all of which are located in the piping.

When an abnormal condition occurs in the turbine or a generator, the main steam valve is closed rapidly and the steam supply to the turbine is stopped. The rapid closure of the main steam valve can generate a pressure wave in the piping which travels back toward the pressure vessel. The steam normally produced by the pressure vessel cannot be supplied due to the adverse pressure gradient in the piping caused by the wave, and accordingly, the pressure in the pressure vessel can experience a sudden increase.

An increase in the pressure in the pressure vessel will cause a corresponding increase in the pressure in the coolant channels of the core. Consequently, voids (steam bubbles) normally present in the core coolant channels are collapsed and the thermal neutron flux in the core increases momentarily because of the increase in the ability of the coolant to moderate the fast neutron flux to thermal levels. The increase in the thermal neutron flux produces a corresponding increase in the nuclear reaction rate, causing the temperature of the nuclear fuel elements to become unacceptably high. The temperature of the coolant-moderator in the core channels increases dramatically as a consequence, leading to a further increase in pressure vessel pressure.

SUMMARY OF THE INVENTION

It is an object of this invention to attenuate a pressure wave occurring in piping supplying steam to a turbine from a steam generator pressure vessel when a main steam valve is closed.

According to this invention, a main steam line apparatus comprises piping connecting a pressure vessel with a turbine, a main steam valve for rapidly stopping the flow of steam being supplied to the turbine through the piping, the main steam valve being located in the piping between the pressure vessel and the turbine, and a header for attenuating the pressure wave which occurs in the piping when the main steam valve is closed rapidly and for suppressing the increase in pressure in the pressure vessel due to the pressure wave, the header being located in the piping between the pressure vessel and the turbine.

DETAILED DESCRIPTION OF THE PREFERRED EMBODIMENT

Figure 1:
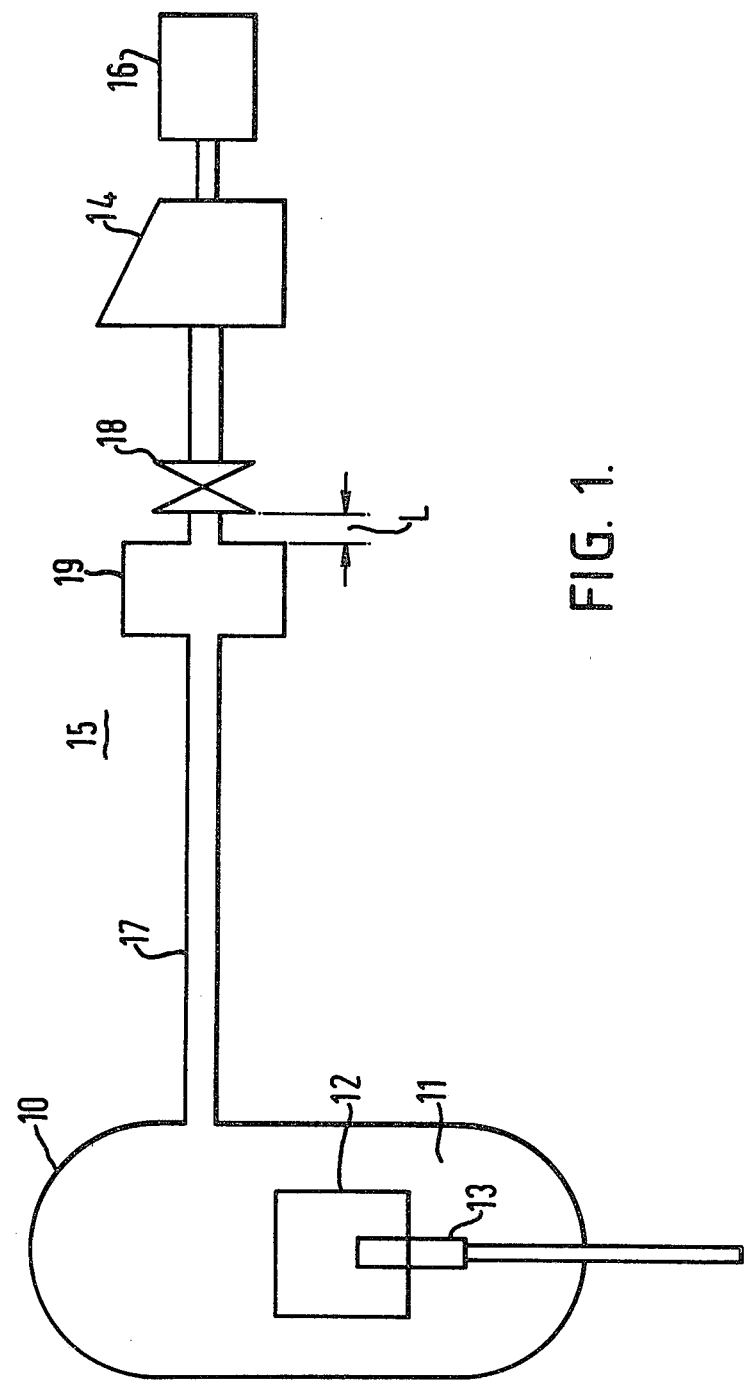
FIG. 1 is a schematic view of a nuclear reactor plant using a main steam line apparatus constructed in accordance with the present invention.

Referring to FIG. 1, a pressure vessel 10 contains coolant 11 and a core 12 including fuel elements and associated coolant channels, as is well known. A control rod 13 controls the reaction rate in the core 12. The coolant 11 is heated in the core 12 and steam is produced and collects in the pressure vessel 10. The steam flows from pressure vessel 10 to a turbine 14 through a main steam line apparatus 15. The turbine 14 is driven by the steam and, in turn, drives a generator 16 operatively connected to the turbine 14 for producing electricity.

In accordance with the present invention, and as embodied herein, the main steam line apparatus 15 is composed of piping 17, a main steam valve 18 and a header 19. One end of the piping 17 is connected to the pressure vessel 10 and the other end is connected to the inlet of turbine 14. The main steam valve 18 is located in the piping 17 between the pressure vessel 10 and the turbine 14. The header 19 is located in the piping 17 between the pressure vessel 10 and the main steam valve 18.

The header 19 is schematically shown in FIG. 1. Ideally, the header 19 should be constructed to attenuate the pressure wave produced in the piping 17 when the main steam valve 18 is closed in the shortest period of time. The absorption or attenuation effect of the header 19 on the pressure wave depends both on the volumetric capacity of the header 19 and on the location of header 19 in the piping 17 relative to the main steam valve 18.

Preferably, the distance L in meters between the header 19 and the main steam valve 18 should be made less than A·Tv, where A is the sound propagation velocity in the steam in meters/second, and Tv is the shortest closing time of the main steam valve in seconds. That is, Tv is the duration time from the beginning to the completion of the main steam valve closing.

For main steam line apparatus constructed in accordance with the present invention, though the main steam valve is closed rapidly when the turbine 14 or the generator 16 is in an abnormal condition, the rate of increase in the pressure in the pressure vessel 10, due to the pressure wave in piping 17, will be very small.

The pressure wave from the main steam valve 18 is attenuated by reflection and absorption in the header 19. Because of the capacity and location of header 19, the pressure wave can thus be effectively attenuated by use of the present invention.

The effect and benefits of this invention will be explained through the following experiments carried out in a simulated main steam line apparatus and calculation results by the method of characteristics. In these experiments, the closing time Tv of the main steam valve 18, the temperature of the fluid and the flow rate of the fluid were held constant.

Figure 2:
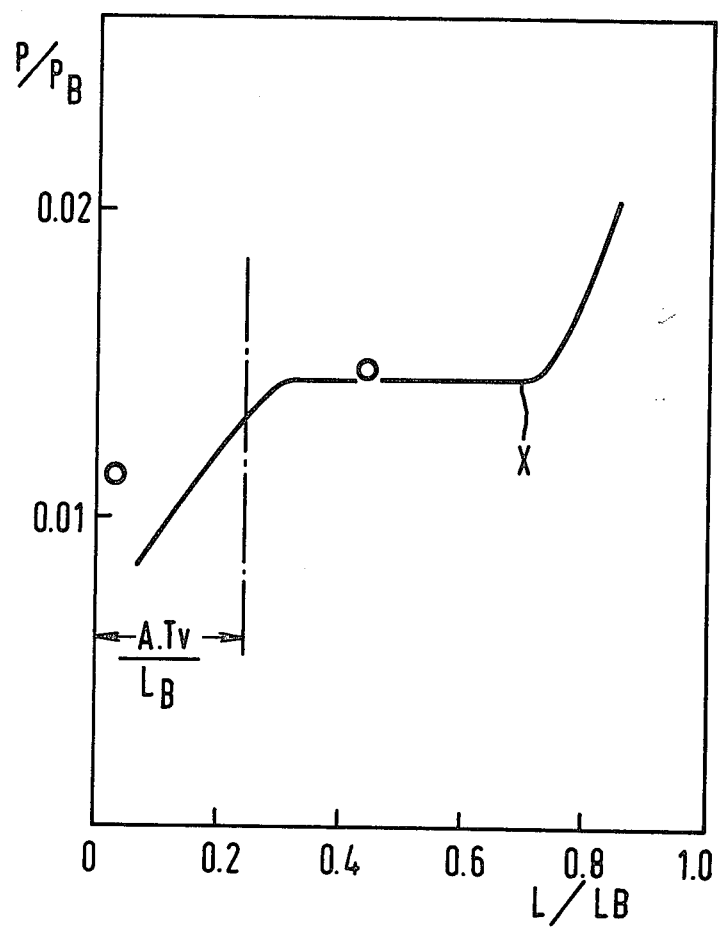
FIG. 2 is a graph showing the pressure wave attenuation effect of the header according to the location of the header.

The rate of increase in the pressure in the pressure vessel 10 was determined by varying the location of the header 19 along the piping 17. Consequently, FIG. 2 was obtained. Referring to FIG. 2, the abscissa is the ratio of the distance L between the header 19 and the main steam valve divided by the length $L_B$ of the piping 17 between the pressure vessel 10 and the main steam valve 18. The ordinate is the ratio of the increase in pressure P in the simulated pressure vessel divided by the steady state pressure $P_B$ in the piping. In FIG. 2, the curve designated by X is the result calculated using the method of characteristics, and the black points are the experimental measurements.

As can be seen in FIG. 2, if the distance L between the header 19 and the main steam valve 18 is small, the pressure increase in the pressure vessel 10 as a result of the pressure wave is significantly reduced. The value 0.25 of the abscissa shows well the effect of location on the attenuation effect of the header. The product of A and Tv divided by $L_B$ for the experimental apparatus proved to be nearly 0.25. Hence, FIG. 2 demonstrates that if the header can be located a distance L from the main steam valve, where L is less than A·Tv, the pressure attenuation effect by the header 19 is maximized. Accordingly, the pressure increase in the pressure vessel 10 can be held to a very small value.

Figure 3:
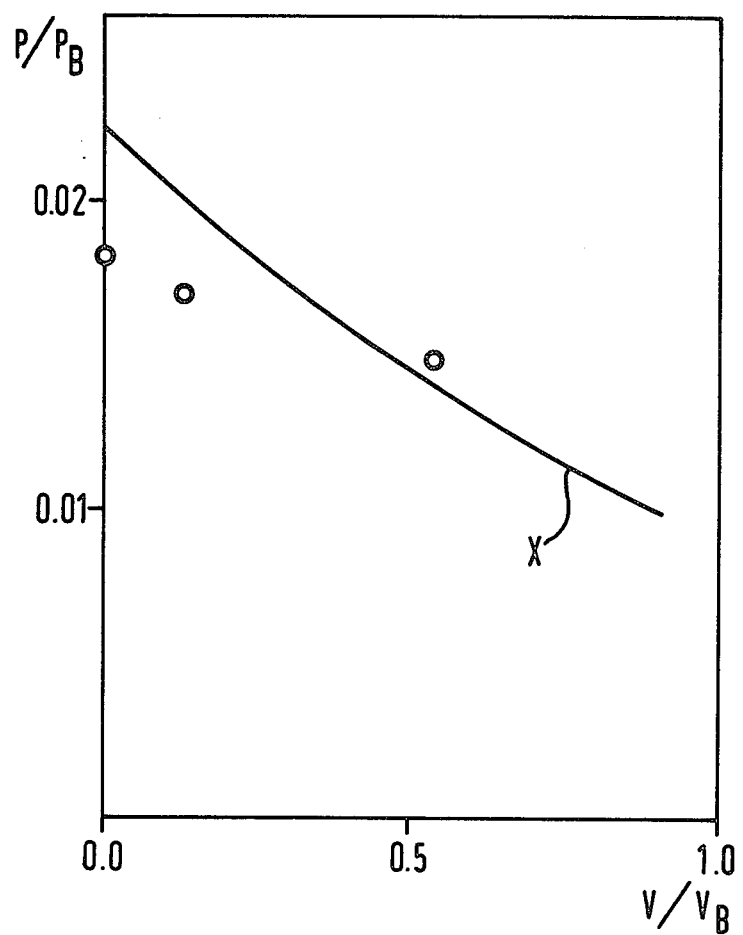
FIG. 3 is a graph showing the pressure wave attenuation effect of the header according to the capacity of the header.

In addition, FIG. 3 was obtained as a result of the experiments. FIG. 3 shows the relationship between the increase in pressure in the pressure vessel 10 and the volumetric capacity of the header 19. Referring to FIG. 3, the abscissa is the ratio of the capacity V of the header 19 divided by the capacity $V_B$ of the piping 17 excluding the capacity of header 19, and the ordinate is the ratio of the increase in pressure P in the simulated pressure vessel divided by the steady state pressure $P_B$ in the piping. The curve designated by X in FIG. 3 is the calculated result using the method of characteristic and the black points are the experimental measurements.

As shown in FIG. 3, the ability of the header to suppress an increase in the pressure of the pressure vessel is augmented as if the capacity of the header is made large.

What is claimed is:

1. A main steam line apparatus for use in carrying steam from a pressure vessel to a turbine in a boiling water nuclear reactor plant, the apparatus comprising:
   (a) piping connecting the pressure vessel with the turbine;
   (b) a main stream valve for rapidly stopping the flow of steam being supplied to the turbine through said piping, said main steam valve being located in said piping between the pressure vessel and the turbine; and
   (c) a header for attenuating the pressure wave which occurs in said piping when said main steam valve is closed rapidly and for suppressing the increase in pressure in the pressure vessel due to the pressure wave, said header being located in said piping between the pressure vessel and said main stream valve,
wherein the distance between said header and said main steam valve is less than A·Tv, where A is the sound propagation velocity in the steam and Tv is the closing time of said main steam valve.

* * * * *

UNITED STATES PATENT AND TRADEMARK OFFICE
CERTIFICATE OF CORRECTION

PATENT NO. : 4,448,023
DATED : May 15, 1984
INVENTOR(S) : Mutsuhiro Arinobu and Isamu Suzuki It is certified that error appears in the above—identified patent and that said Letters Patent is hereby corrected as shown below:

On the Title Page, change the name of the first named inventor to

-- MUTSUHIRO ARINOBU --

In claim 1, col. 4, line 13, change "stream" to --steam--.

Signed and Sealed this

Fourth Day of September 1984

[SEAL]

Attest:

GERALD J. MOSSINGHOFF

Attesting Officer

Commissioner of Patents and Trademarks